United States Patent [19]
Takenouchi

[11] Patent Number: 4,566,785
[45] Date of Patent: Jan. 28, 1986

[54] MAGAZINE FOR SUPPLYING A STRIP OF PHOTOGRAPHIC PRINTING PAPER
[75] Inventor: Toru Takenouchi, Wakayama, Japan
[73] Assignee: Noritsu Kenkyu Center Co., Ltd., Japan
[21] Appl. No.: 591,806
[22] Filed: Mar. 21, 1984
[30] Foreign Application Priority Data
Mar. 24, 1983 [JP] Japan ............................ 58-41258[U]
[51] Int. Cl.$^4$ ............................................ G03B 27/58
[52] U.S. Cl. ...................................... 355/72; 354/275; 242/55.53; 242/67.3 R; 242/67.5; 226/176; 226/177
[58] Field of Search ...................... 355/72, 64, 29, 27, 355/28; 354/275; 352/72, 78, 172; 242/55.53, 67.3 R, 67.5; 226/176, 177

[56] References Cited
U.S. PATENT DOCUMENTS

| 1,090,128 | 3/1914 | Avers ............................ 352/172 X |
| 3,622,095 | 11/1971 | Turner ........................ 242/55.53 X |
| 4,465,365 | 8/1984 | Toyoda ................................ 355/45 |

Primary Examiner—L. T. Hix
Assistant Examiner—Brian W. Brown
Attorney, Agent, or Firm—Larson and Taylor

[57] ABSTRACT

An improved detachable or replaceable magazine for supplying a strip of printing paper to a photographic printer or photographic processor is disclosed. The magazine includes a case, a cover turnably mounted on the case and a printing paper delivering port on the case, a reel supporting member adapted to rotate also in the direction of rewinding by a manual actuation member disposed outside the case, a guide member for guiding movement of the printing paper with its both side edges being inserted into vertically extending grooves, a printing paper delivering roller section for delivering the printing paper by a manual actuation member disposed outside the case with a ratchet wheel being arranged for inhibiting rotation of a roller in the reverse direction as required, a printing paper detecting roller section for detecting the existence of printing paper and displacing a stopper plate in the direction of locking when no printing paper is existent so as to allow the printing paper delivering roller section to be inhibited from rotation in the reverse direction when the stopper plate comes in engagement to the ratchet wheel, and an unlocking member adapted to be actuated in operative association with opening operation of the cover.

11 Claims, 11 Drawing Figures

MAGAZINE FOR SUPPLYING A STRIP OF PHOTOGRAPHIC PRINTING PAPER

BACKGROUND OF THE INVENTION

1. Field of the Invention

The present invention relates to a detachable or replaceable magazine for supplying a strip of printing paper to a photographic printer or photographic processor and more particularly to improvement of or relative to a magazine for supplying a strip of printing paper wound in the form of a roll therefrom to a photographic printer or photgraphic processor.

2. Description of the Prior Art

A hitherto known printing paper supplying magazine of the above-mentioned type is operated such that prior to supplying a strip of printing paper to a photographic printer or photographic processor the leading end part of printing paper is pulled out of a printing paper delivering port on the magazine in the tongue-shaped configuration by a length in the range of 10 to 15 cm and it is then brought to the working area between a pair of driving rollers both of which are incorporated in the photographic printer or photographic processor to pull and forward a required length of printing paper from the magazine.

Thus, it has been pointed out as an inherent drawback to the conventional magazine that the leading end part of printing paper in the tongue-shaped configuration is unavoidably wasted in vain not only at every time when a magazine with a new roll of printing paper loaded therein is mounted on the photographic printer or photographic processor after the last roll of printing paper is fully consumed but also when the existing magazine is replaced with other one with other roll of printing paper loaded therein before the former is fully consumed because of size change of printing paper.

The drawback as mentioned above becomes increasingly remarkable as a number of photographic instruments such as camera or the like are supplied to consumer market year by year and therefore enthusiastic requirements for obviating the drawback have been raised from the photographic printing paper processing industry.

SUMMARY OF THE INVENTION

Thus, the present invention has been made with the foregoing drawback in mind.

It is a primary object of the present invention to provide an improved detachable or replaceable magaine for supplying a strip of printing paper to a photographic printer or photographic processor in which there is no necessity for pulling a certain length of printing paper in the tongue-shaped configuration out of the printing paper deliverting port on the case of the magazine not only when a magazine with a new roll of printing paper loaded therein is mounted on the photographic printer or photographic processor but also when the existing magazine is replaced with other one with other roll of printing paper loaded therein before the existing roll of printing paper is fully consumed.

It is another object of the present invention to provide an improved detachable or replaceable magazine for supplying a strip of printing paper to a photographic printer of photographic processor by which printing paper can be supplied to the latter through the printing paper receiving port disposed thereon without necessity for pulling a certain length of printing paper in the tongue-shaped configuration out of the printing paper delivering port on the case of the magazine.

It is another object of the present invention to provide an improved detachable or replaceable magazine for supplying a strip of printing paper to a photographic printer or photographic processor which is simple in structure and can be operated without highly trained skill merely by mounting it on the latter with the minimum manual handling required.

To accomplish the above objects there is proposed in accordance with the present invention a detachable or replaceable magazine for supplying a strip of printing paper to a photographic printer or photographic processor of the type comprising a case constituting the magazine body, a cover turnably mounted on the top of said case, a printing paper delivering port formed on the case with a light shielding plate displaceably fitted thereto, a detachable or replaceable reel supporting member for supporting a reel wound with printing paper, said reel supporting member being adapted to rotate also in the direction of rewinding of the printing paper by a manual actuation member disposed outside of the case, a guide member for guiding movement of the printing paper while its both side edges being inserted into vertically extending grooves on said guide member, a printing paper delivering roller section including a pair of rollers and a ratchet wheel fixedly mounted on a roller shaft, said rollers delivering the printing paper by a manual actuation member disposed outside the case and said ratchet wheel inhibiting rotation of said rollers in the reverse direction as required, a printing paper detecting roller section for detecting the existence of printing paper and displacing a stopper plate in the direction of locking when no printing paper is existent, said stopper plate serving to inhibit rotation of said printing paper delivering roller section in the reverse direction when it is brought in engagement to said ratchet wheel, and an unlocking member adapted to be actuated in response to opening operation of the cover.

Other objects, features and advantages of the present invention will become more clearly apparent from reading of the following description which has been prepared in conjunction with the accompanying drawings.

BRIEF DESCRIPTION OF THE DRAWINGS

The accompanying drawings will be briefly described below. It should be noted that they illustrate a printing paper supplying magazine in accordance with a preferred embodiment of the invention which has been made in the form of modification from a conventional printing paper loading dark box integrally mounted on a photographic printer for which patent applications were already filed by the same assignee under British Patent application No. 8340570, U.S. patent application Ser. No. 06/467,334, now U.S. Pat. No. 4,465,365 of Aug. 14, 1984, and Canadian Patent application No. 421,820 and that description is made only within the minimized extent for the purpose of simplification with respect to structural components constituting the magazine of the invention which are well known for any expert in the art.

It should be noted that same or similar parts or components as illustrated throughout the drawings are identified with the same reference numeral.

DESCRIPTION OF THE PREFERRED EMBODIMENT

Now, the present invention will be described in a greater detail hereunder with reference to the accompanying drawings which illustrate a preferred embodiment thereof.

Figure 1:
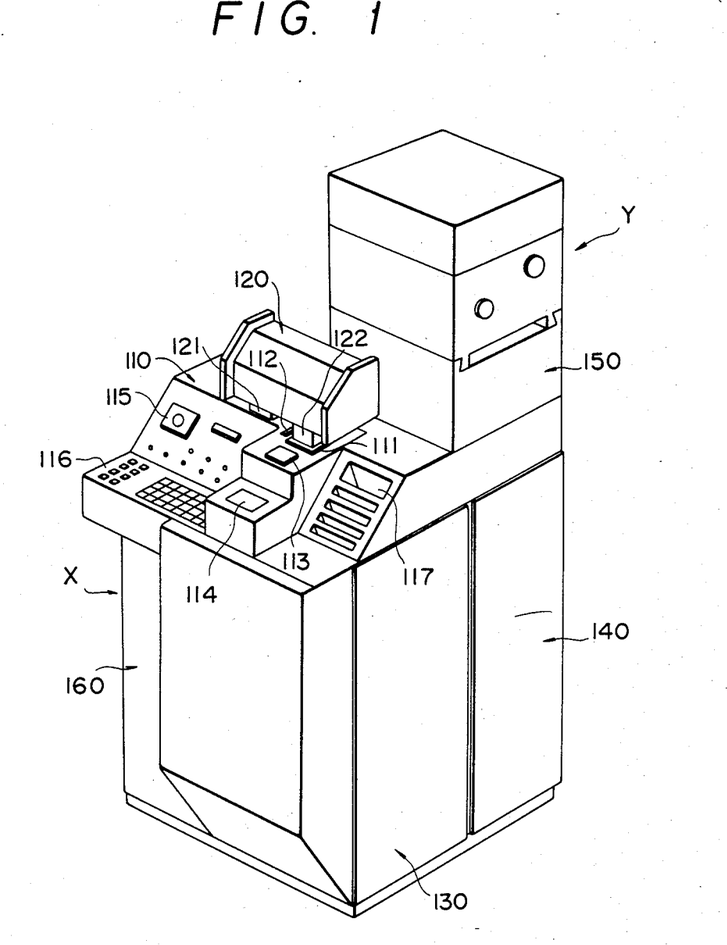
FIG. 1 is a perspective view of a photographic printer on which the magazine of the invention is mounted.
Figure 2:
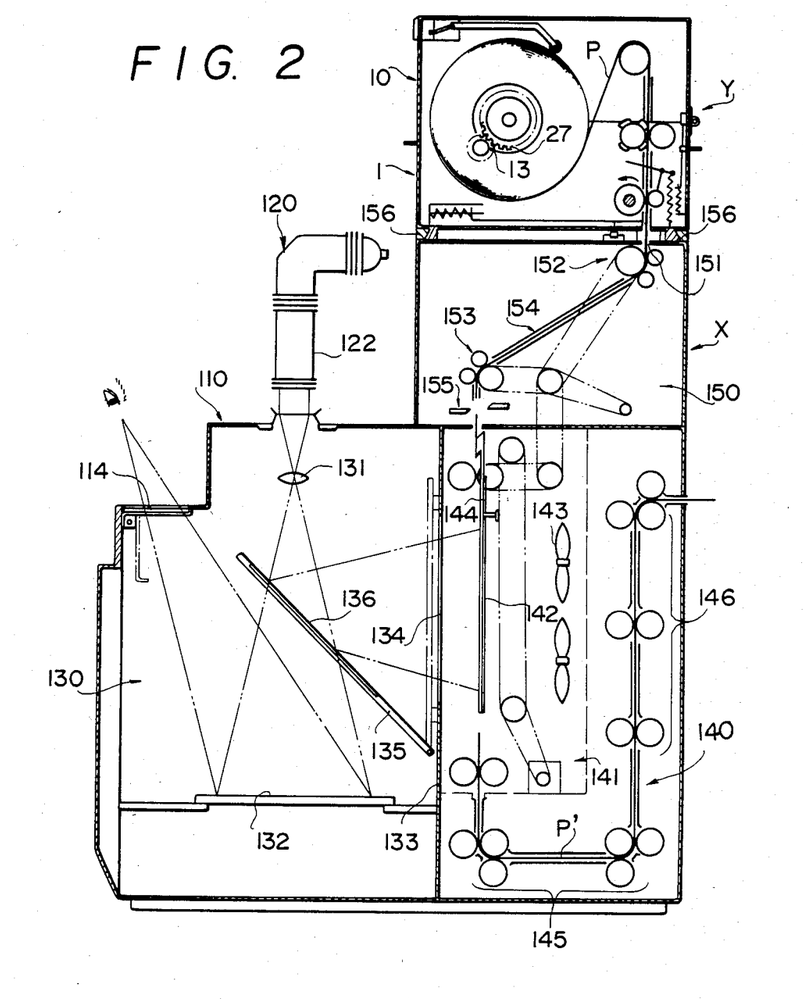
FIG. 2 is a vertical sectional view of the photographic printer in FIG. 1.

Refering first to FIGS. 1 and 2 reference letter X designates a photographic printer and reference numeral Y does a magazine for supplying a strip of photographic printing paper in accordance with the present invention (hereinafter referred to simply as magazine).

It should be noted that the photographic printer as identified with reference letter X belongs to a printer modified from the conventional one which was already filed for patent by the same assignee under British Patent application No. 8340570, U.S. patent application Ser. No. 06/467,334, now U.S. Pat. No. 4,465,365, and Canadian Patent application No. 421,820, wherein modification was made merely on a dark box adapted to hold a roll of photographic printing paper as will be readily apparent from the following description with reference to the abovementioned specification and accompanying crawings. Therefore, repeated description will not be required for the photographic printer X but main components constituting the photographic printer X (hereinafter referred to simply as printer) will be briefly described in the following.

In the printer X reference numeral 110 designates an upper plate section, reference numeral 120 does a light source box, reference numeral 130 does a dark box for trimming operation, reference numeral 140 does a dark box in which exposing is effected for a strip of photographic printing paper P (hereinafter referred to simply as printing paper), reference 150 does a dark box in which printing paper P is delivered and cut to a predetermined length and reference numeral 160 does a control box.

On the upper plate section 110 are arranged a negative film mask plate 111 with a negative film mask stopper 112 disposed in the proximity of the former to serve as cooperating means, an optical density determining window 113 for determining whether or not a negative film has proper density and no color failure, said optical density determining window 113 including a hood as cooperating means (not shown in the drawings), a trimming window 114 including a hood (not shown in the drawings), a control panel 115 with control dials and others disposed thereon for operation of the printer, a key board 116 with a number of keys disposed thereon for operation of the printer X and a pocket 7 for accomodating small articles such as negative film mask or the like therein. In addition to the components as mentioned above a light source box 120 is fixedly mounted above the support column 121 which stands upright above the upper plate section 110 and a mirror tunnel 122 is arranged beneath the light source box 120.

On the other hand, in the trimming dark box 130 with the upper plate section 110 integrally fitted thereto are arranged an exposure lens 131 adapted to be displaced upwardly or downwardly in relation to focussing and printing size, and a screen 132. Further, in addition to them the trimming dark box 130 includes a mirror support 135 with a mirror 136 carried thereon of which circumference is lined with light shielding material, said mirror support 135 being constructed such that when focussing, printing size determination and trimming are to be carried out with the aid of the screen 132, it is caused to turn out of the light beam passage in the rightward direction as seen in the drawing until a light beam introduction opening 134 is closed, said light beam introduction opening 134 being formed on a partition between the trimming dark box 130 and the exposing dark box 140, whereas when exposing is to be effected for the printing paper P delivered to the exposing dark box 140, it is caused to turn by a predetermined angle in the leftward direction as seen in the drawing.

Further, in the exposing dark box 140 are arranged an exposing section 141 including a vertical guide plate 142 with a large number of air passage holes formed thereon for firmly holding the printing paper P' in the form of a sheet which is delivered from the delivering and cutting dark box 150, a plurality of suction fans 143 for thrusting printing paper P' against the vertical guide plate 142 under the influence of reduced pressure and a displacing member 144 for displacing the printing paper P' downwardly, a high speed printing paper transporting section 145 with a plurality of guiding rollers disposed for the travelling printing paper P' and a low speed printing paper transporting section 146 with a plurality of guide rollers disposed for the travelling printing paper P', said low speed printing paper transporting section 146 being controlled such that the operating speed of the guide rollers is identical to processing speed of the printing paper P' in a processor (not shown in the drawings) which is operatively connected to the exposing dark box 140.

Further, in the delivering and cutting dark box 150 are arranged a first printing paper delivering roller section 152 for firmly holding the foremost end part of the printing paper P unreeled from the magazine Y via an outlet port 151 and then intermittently delivering it, said outlet port 151 being fitted with light shielding material such as plush or the like along its circumference, a second printing paper delivering roller section 153, a guide member 154 for slidably guiding the travelling printing paper P while both the side edges are fitted thereinto and a cutter section 155 for cutting off the printing paper P to a predetermined length to prepare a printing paper P' in the form of a sheet. On the ceiling of the delivering and cutting dark box 150 are arranged two lines of guide rails 156 to be described later, said guide rails 156 serving to mount the magazine Y thereon, and a group of limit switches 157 for generating an identifying signal relative to the size of printing paper P accomodated in the magazine Y.

Next, the detailed structure of a magazine Y as constructed in accordance with the present invention will be described with reference to FIGS. 3 to 11.

Figure 3:
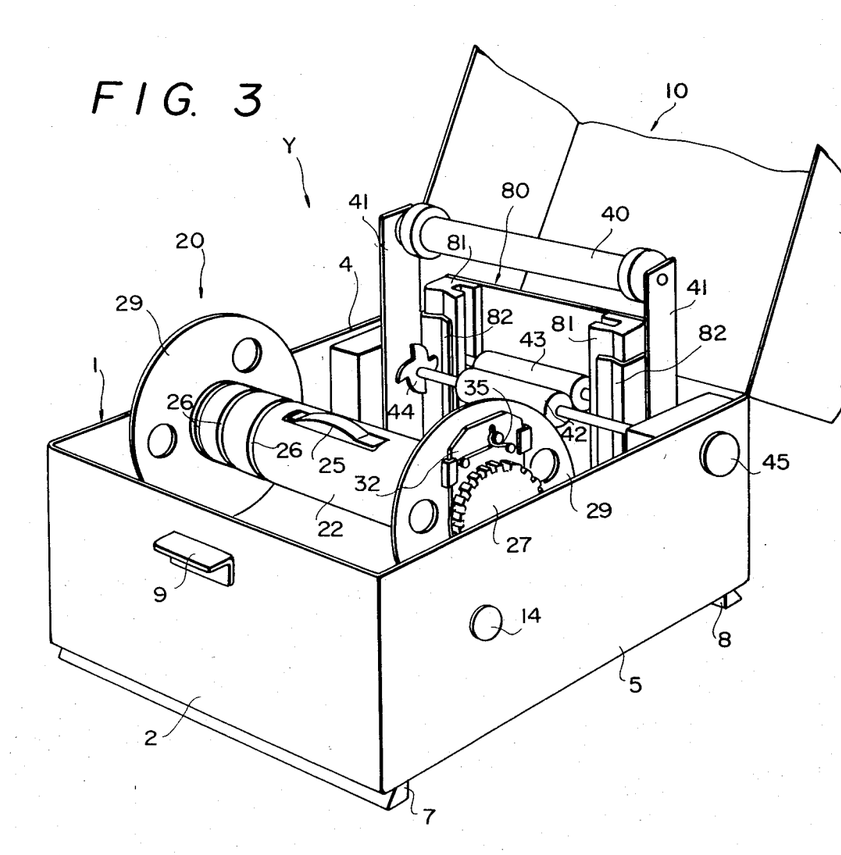
FIG. 3 is a perspective view of the magazine of the invention with a cover kept in the opened state, shown in an enlarged scale.

In the drawings reference numeral 1 designates a case constituting the main body for the magazine. The case 1 is composed of a front plate 2, a rear plate 3, both side plates 4, 5 and a bottom plate 6. Reference numerals 7 and 8 designate a mounting foot attached to the bottom plate 6 respectively, said mounting foot extending in parallel with the front plate 2 and the rear plate 3, and reference numeral 9 does a finger bracket fixedly secured to both the front plate 2 and the rear plate 3 so as to allow an operator to carry the magazine by his hands. Reference numeral 10 designates a cover adapted to turn about a hinge 11 located at the top of the rear plate 3.

Further, reference numeral 12 designates a bearing with an U-shaped groove formed thereon which is fixedly secured to the inner wall of both the side plates 4 and 5 at the position located offset from the middle toward the front plate 2 so that both the end parts of a support shaft 21 for the reel support member 20 are detachably fitted into said U-shaped grooves on the bearings 12. Thus, a reel R with the printing paper P in the form of a roll carried on the support shaft 21 is rotatably held on the case 1.

The reel support member 20 adapted to be detachably fitted to the bearings 12 includes a support shaft 21, a tubular core 22 for carrying a reel R thereon, reel holding plates 29 for immovably holding the reel R and a braking mechanism 36 as main components.

Figure 7:
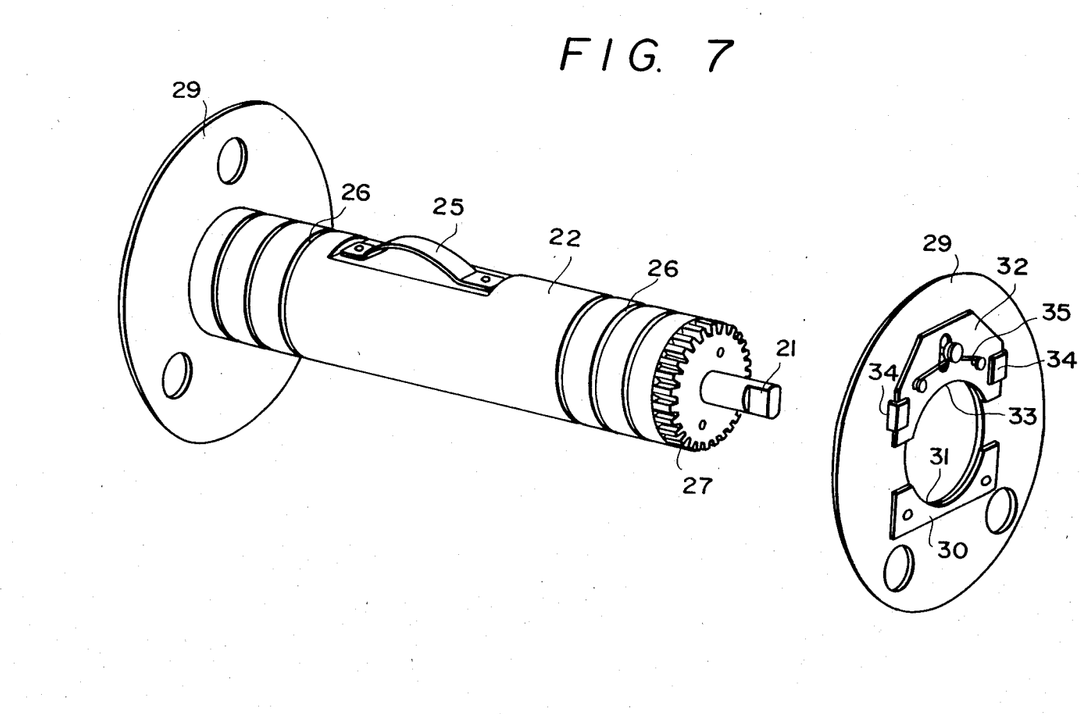
FIG. 7 is a perspective view of a reel supporting member, wherein some components are disassembled from the tubular body.
Figure 8:
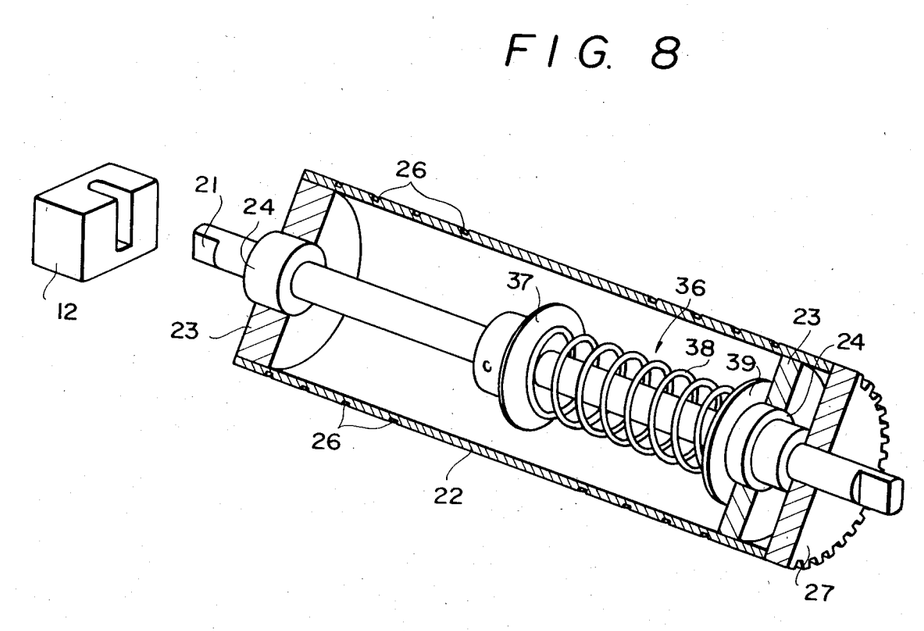
FIG. 8 is a perspective sectional view of the reel supporting member illustrating the inner structure thereof.

As is apparent from FIGS. 7 and 8, the tubular core 22 comprises a tubler body as a main component and includes bearing support plates 23 fixedly secured inside both the ends of the tubular body to support bearings 24 for rotatably holding the support shaft 21, a leaf spring 25 having an arched configuration of which one end part is fixedly secured to the tubular body for inhibiting idle rotation of a reel R, said leaf spring 25 extending in the middle area on the tubular body in the axial direction, and plural annular grooves 26 located in the spaced relation at a predetermined distance from the outermost end of the tubular core 22 and adapted to firmly fit with reel holding plates 29. Further, the tubular core 22 includes a gear wheel 27 adapted to mesh with a pinion 15 fitted onto a rewinding member 13 which includes also a shaft portion supported rotably by the bearing means on the righthand side wall 5 and a handle 14 disposed outside the righthand side wall 5 and adapted to rotate the shaft portion only in the one direction with the aid of an inner gear type ratchet wheel mechanism. It should be noted that when the support shaft 21 is firmly held on the case 1 with both the end parts fitted to the bearings 12, the gear wheel 27 meshes with the pinion 15 fitted onto a rewinding member 13.

Both the reel holding plates 29 are designed in the form of a circular disc with a large bore formed thereon of which inner diameter is dimensioned appreciably larger than the outer diameter of the tubular core 22. As is apparent from FIG. 7, each of the reel holding plates 29 includes a plate 30 for determining a certain fixed position thereof on the tubular body by means of a semi-circular edge 31 adapted to be fitted into one of the annular grooves 26, said plate 30 being disposed on the lower half of the reel holding plate 29, and a movable plate 32 for serving in the same manner as the plate 30 by means of a semi-circular edge 33 adapted to be fitted to the same annular groove 26 under the influence of resilient force of a spring 35 which is normally energized so as to displace the movable plate 32 in the downward direction while it is guided by means of a pair of guide plates 34, said movable plate 32 being disposed on the upper half of the reel holding plate 29 at the position located opposite to the plate 30.

On the other hand, the braking mechanism 36 is arranged within the tubular core 22 so as to inhibit printing paper P from being loosened due to inertia of the reel R when the former is unreeled from the latter. Specifically, it comprises a spring retainer 37 fixedly secured to the support shaft 21, an expansive spring 38 and a frictional plate 39 which is brought in frictional contact with the one bearing support plate 23.

Referring to FIGS. 3, 4, 6 and 9, reference numeral 40 designates an adjust free roller which is bridged between both the upper parts of support plates 41 standing upright at the position located inside the side plates 4 and 5. Thus, the adjust free roller 40 is rotatably supported at the elevated position above the case 1.

In the drawings reference numeral 42 designates a roller fixedly mounted on a shaft rotatably extending between both the side plates 4 and 5 and reference numeral 43 does a roller adapted to be brought in pressure contact with said roller 42. Both the rollers 42 and 43 are located below the adjust free roller 40. On the shaft of the roller 42 is fixedly mounted a ratchet wheel 44 which will be described later and moreover on the shaft end projected outwardly of the case 1 is disposed a handle 45 which serves to rotate the roller 42 only in the one direction of delivering of the printing paper P with the aid of a inner gear type ratchet wheel machamism. Thus, a roller section for delivering the printing paper P is constructed in the above-described manner.

Further, in the drawings reference numeral 46 designates a stepped roller with a reduced diameter portion 47 formed in the middle, said stepped roller being rotatably supported in the space as defined between both the side plates 4 and 5 and located below the roller 42 constituting said roller section, and reference numeral 48 does a roller disposed at the position located below the roller 43 and adapted to enter into or leave from the reduced diameter portion 47 of the roller 46. Specifically, the roller 48 is rotatably held on one end part of bell crank-shaped arm 49 of which bent portion is fixedly secured to a shaft 50 rotatably supported between both the side plates 4 and 5. Owing to the arrangement of a contractive spring 51 between the other part of the bell crank-shaped arm 49 and the bottom plate 6, the roller 48 is normally urged to enter into the reduced diameter portion 47. Thus, a detecting roller section for detecting whether the printing paper P is existent in the roller section or not is constructed in the above-described manner.

Figure 9:
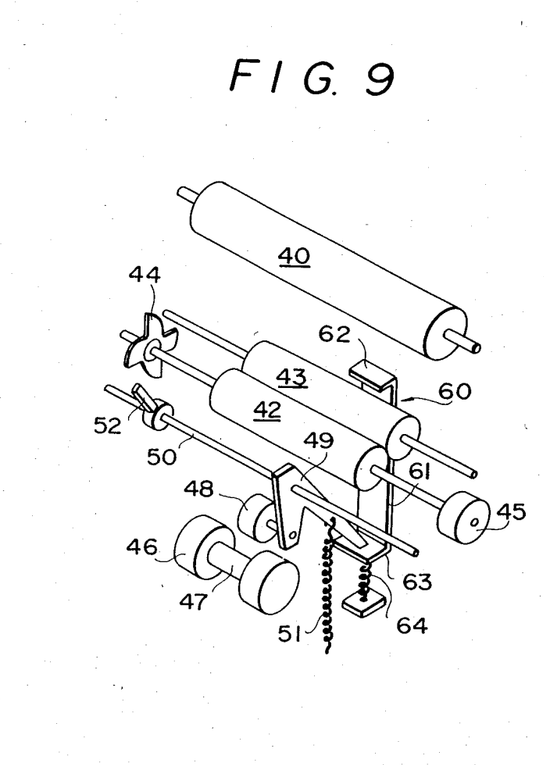
FIG. 9 is a schematic perspective view illustrating how a printing paper delivering roller section, a printing paper detecting roller section and an unlocking member are arranged in operative association with one another.

In the drawings reference numeral 52 designates a stopper plate fixedly mounted on a shaft 50 so as to come in engagement to or out of engagement from the ratchet wheel 44 fixedly mounted on the shaft of the roller 42 as the shaft 50 is rotated clockwise or anticlockwise. The stopper plate is operated in such a manner that when the roller 48 in the detecting roller section enters into the reduced diameter portion 47 of the stepped roller 46, it is caused to be involved within the circular track of the ratchet wheel 44 and thereby the roller 42 is inhibited from rotation in the reverse direction, that is, in the direction of recoiling of the printing paper P, resulting in the roller 42 kept in the locked state and the printing paper P prevented from recoiling due to its friction against the roller 42.

Figure 4:
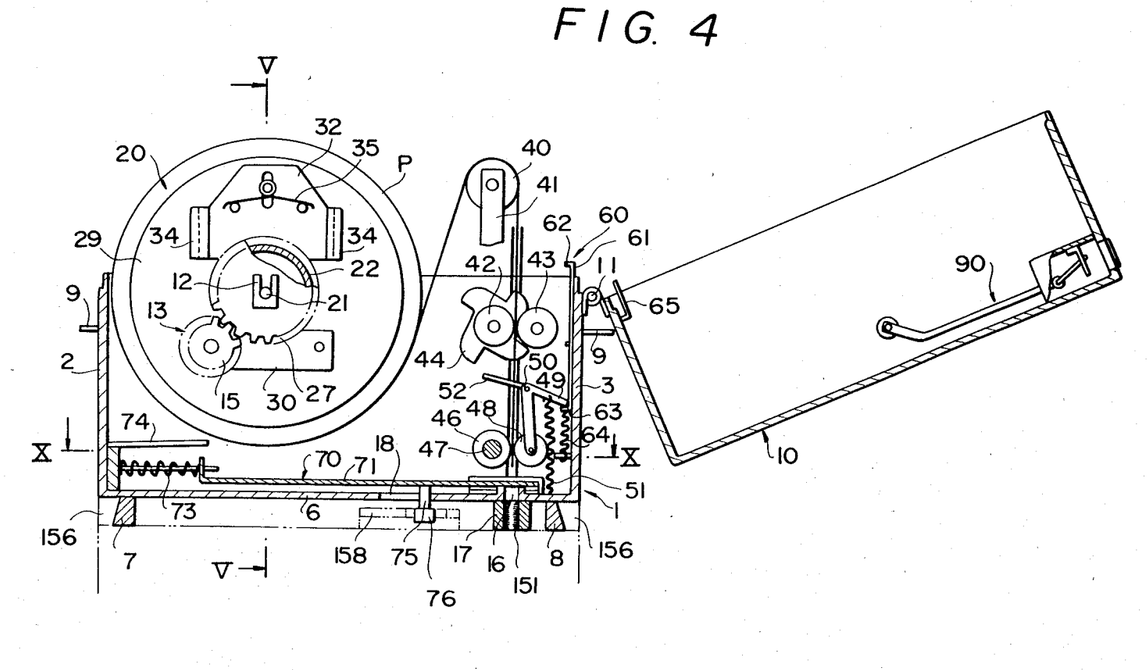
FIG. 4 is a vertical sectional view of the magazine taken in line IV—IV in FIG. 5, wherein some components are cut away.
Figure 5:
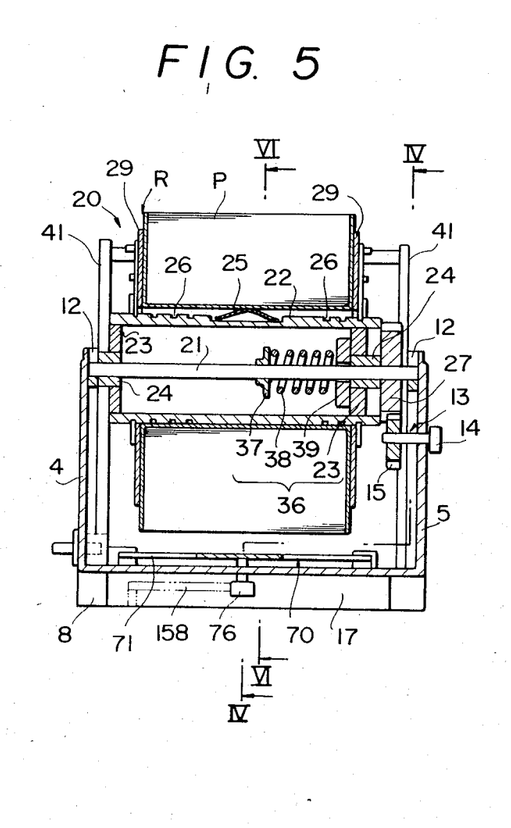
FIG. 5 is a vertical sectional view of the magazine taken in line V—V in FIG. 4, wherein the cover is removed from illustration.

Further, in the drawings reference numeral 61 designates a slide plate slidably fitted to the inner wall of the rear plate 3. The slide plate 61 includes a bent plate 62 at its upper end part for receiving thrusting force active in the downward direction and another bent plate 63 at its lower end part which is adapted to come in engagement to the other end part (righthand part in the drawing) of the bell crank-shaped arm 49 during upward sliding movement of the slide plate 61 to release the roller 42 from the locked state by rotating the shaft 50 anticlackwise via the bell crank-shaped arm 49. To allow the slide plate 61 to be normally urged to slide in the upward direction an expansive spring 64 is fitted to the bottom of the lower bent plate 63, wherein resilient force of the expansive spring 64 is determined larger than that of the contractive spring 51. Reference numeral 65 designates a thrusting force transmitting member attached to the cover 10 by way of which thrusting force is transmitted downwardly to the upper bent plate 62. When the cover 10 is turned in the anticlockwise direction as seen in the drawing to be closed on the case 1, the thrusting force transmitting member 65 is brought in abutment against the upper bent plate 62 so that the slide plate 61 is displaced downwardly. On the other hand, when the cover 10 is opened as illustrated in FIG. 4, the slide plate 61 is displaced upwardly under the influence of resilient force of the expansive spring 64 which is transmitted thereto via the lower bent plate 63. Thus, an unlocking section 60 is constructed in the above-described manner.

Specifically, when the cover 10 is kept closed, the lower bent plate 63 assumes the position below the other part of the bell crank-shaped arm 49 and the pressure roller 48 is caused to enter into the reduced diameter portion 47 of the stepped roller 46 as long as printing paper P is not existent. Thus, the foremost end part of the stopper plate 52 comes in engagement to the ratchet wheel 44, resulting in the roller 42 being locked. On the other hand, when the cover 10 is opened and thereby the slide plate 61 is displaced upwardly, the lower bent plate 63 comes in engagement to the lowermost end of the other part of the bell crank-shaped arm 49 to raise up the latter and thereby the shaft 50 is rotated so that the stopper plate 52 is disengaged from the ratchet wheel 44 on the roller 42 whereby the latter is released from the locked state.

Referring to FIGS. 4, 5, 6 and 10, reference numeral 71 designates a light shielding plate for closing a printing paper delivering port 16 which is formed on a light shielding piece 17 attached to the bottom plate 6, said light shielding plate being located below the printing paper detecting roller section. The light shielding plate 71 is arranged so as to slide along the upper surface of the bottom plate 6 in both the forward and backward directions relative to the case 1. Reference numeral 72 designates a guide member with a stopper fitted thereto for guiding the light shielding plate 71 and causing the latter to be stopped when it reaches the light shielding position, said guide member being attached to the bottom plate 6. Reference numeral 73 designates an expansive spring which normally urges the light shielding plate 71 to be thrusted in the direction of closing of the printing paper delivering port 16, reference numeral 74 does a cover plate and reference numeral 75 does a pin extending downwardly of the lower surface of the light shielding plate 71. The pin 75 projects outwardly of an elongated hole 18 which is formed on the bottom plate 6 at a right angle relative to the printing paper delivering port 16 and it has a roller rotatably carried at the lowermost end part thereof. Thus, a light shielding member 70 is constructed for the printing paper delivering port 16 to be closed by a combination of the above-described components.

Figure 10:
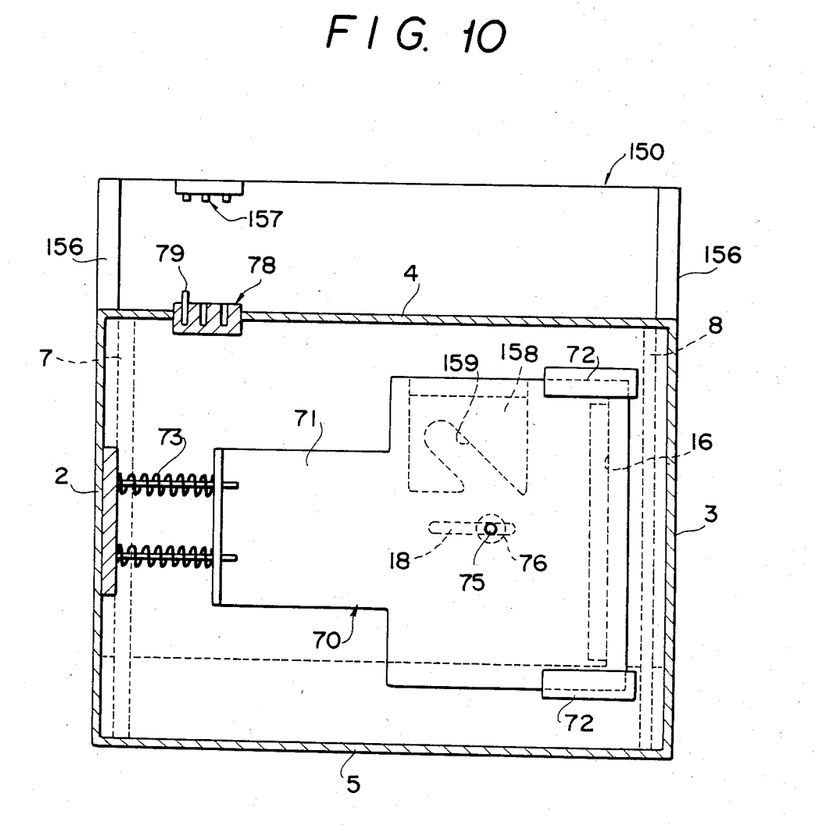
FIG. 10 is a cross-sectional view of the magazine taken in line X—X in FIG. 4, illustrating how a light shielding plate serving as a light shielding member is operated to close a printing paper delivering port.
Figure 11:
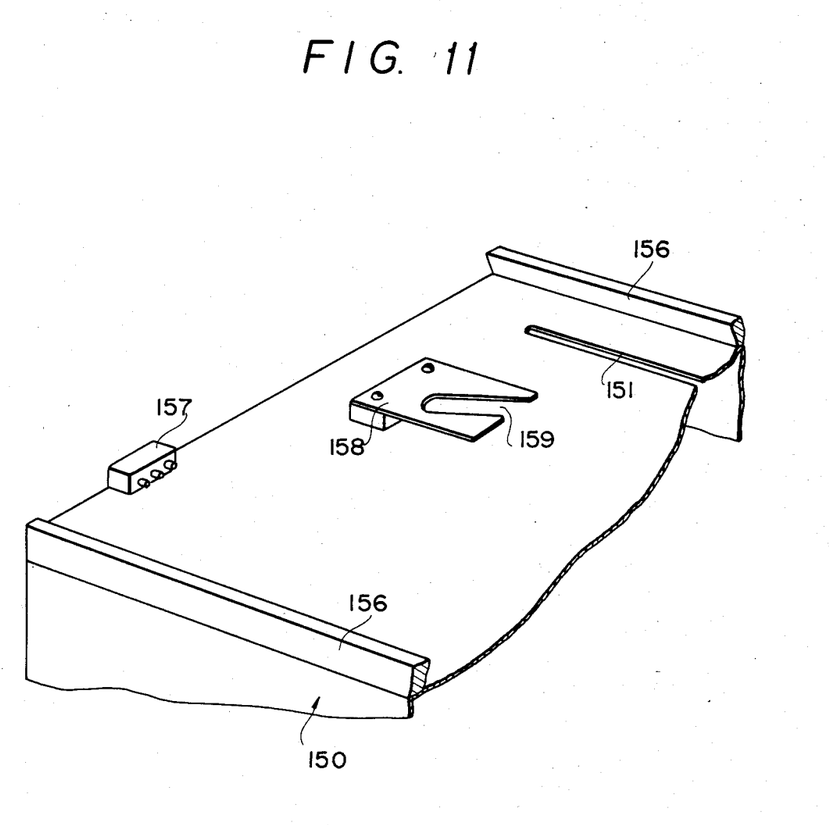
FIG. 11 is a fragmental perspective view of the upper part of the photographic printer with a guide plate for actuating the light shielding plate mounted thereon.

As will be apparent from FIGS. 10 and 11, actuation of the light shielding plate 71 for opening the delivering port 16 is carried out by way of the steps of fitting the magazine Y in the sideward direction with the aid of two guide rails 156 on the ceiling plate of the dark box 150 which are brought in sliding contact with the mounting feet 7 and 8 on the bottom plate 6 of the case 1, causing the roller 76 at the lowermost end part of the pin 75 to gradually enter into a guide groove 159 on a guide plate 158 fixedly secured to the ceiling plate of the dark box 150 in the cantilever fashion, said guide groove 159 extending at a certain inclination angle relative to the printing paper receiving port 151, and displacing the light shielding plate 71 against resilient force of the expansive spring 73 until the printing paper delivering port 16 is opened and located in vertical alignment with the printing paper receiving port 151 to be sielded with the light sielding piece 17.

Further, referring to FIGS. 10 and 11, reference numeral 78 designates a printing paper size identifying member fixedly disposed on the lefthand side plate 4 of the case 1. The printing paper size identifying member 78 is used in such a manner that a pin 79 is inserted into a certain drilled hole on the identifying member 78 which is determined in dependence on a selected size of printing paper P loaded in the magazine Y. On completion of mounting of the magazine Y on the printer X the pin 79 abuts against one of a group of limit switches 157 to close it and thereby a signal is transmitted to the printer X so as to inform the existing size of printing paper P loaded in the magazine Y.

As is best seen from FIG. 3, a guide member 80 is arranged along both the sides of a series of rollers in the printing paper delivering roller section including the roller 42 and the pressure roller 43 as main components and the printing paper detecting roller section including the stepped roller 46 and the pressure roller 48 as main components. As illustrated in the drawing, the guide member 80 is located below the adjust free roller 40 and extends down to the printing paper delivering port 16. The guide member 80 includes an opposing pair of guide pieces 81 with vertically extending grooves formed thereon so as to allow both the side edges of printing paper P to be inserted into said grooves and an arrangement is made such that the guide pieces 81 can be replaced into support column 82 with another ones in dependence on the width of printing paper to be used.

Figure 6:
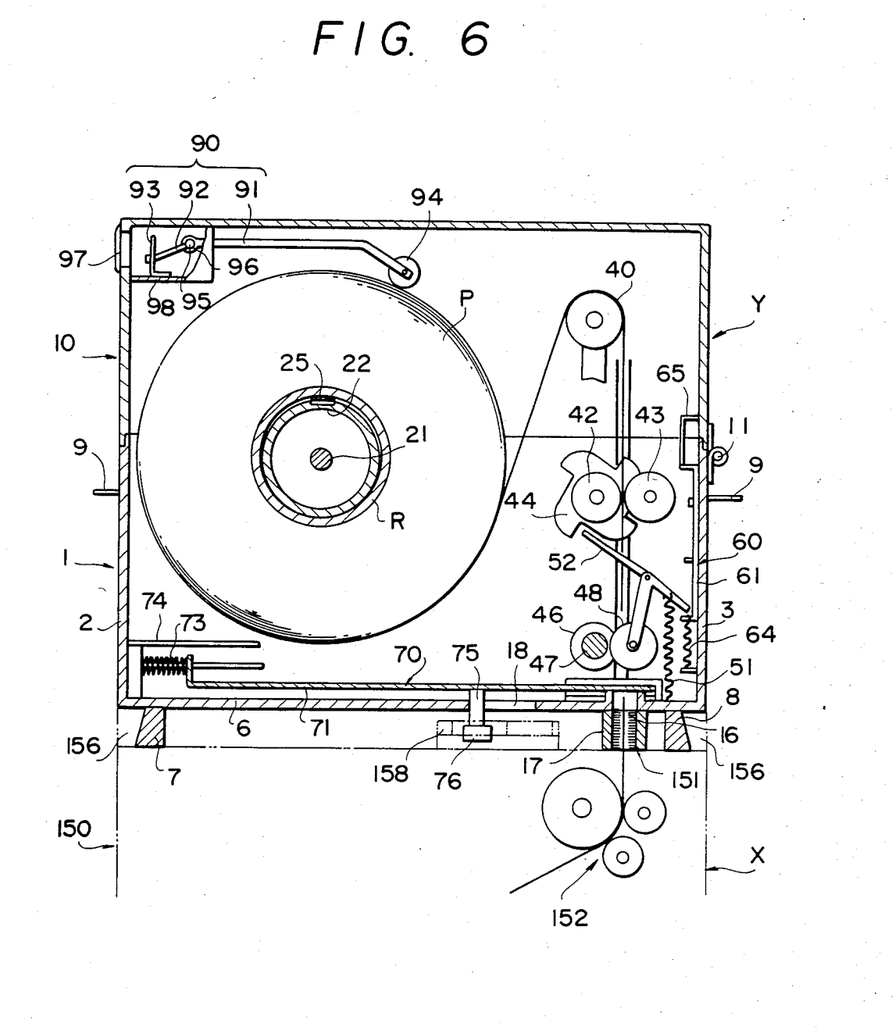
FIG. 6 is a vertical sectional view of the magazine taken in line VI—VI in FIG. 5, wherein the cover is fully closed.

Finally, refering to FIGS. 4 and 6, reference numeral 90 designates a residual printing paper detector which serves to detect how long printing paper P is still wound on the reel R. The residual printing paper detector 90 comprises a detecting arm 91 with a roller 94 rotatably carried on the foremost end part thereof, said roller 94 being normally brought in rolling contact with printing paper P wound about the reel R, an indicator 92 operatively associated with said detecting arm 91 and a calibrated plate 93 for numerically displaying the residual amount of printing paper. Reference numeral 95 designates a bent pin by means of which the indicator 92 is connected to the base portion of the detecting arm 91. The bent pin 95 is rotatably supported on a bearing 96 attached to the one side plate of a light shielding box 98 which is formed by utilizing a part of the front plate 2 on the case 1. Reference numeral 97 designates a window through which an operator can observe the indicator 92 and the calibrated plate 93.

Next, operation of the printing paper supplying magazine Y constructed in the above-mentioned manner will be described below.

The magazine Y is first carried in a dark room and the cover 10 is then opened therein. The slide plate 61 in the unlocking section 60 is displaced upwardly under the influence of resilient force of the expansive spring 64 and thereby the lower bent plate 63 is brought in abutment against the lower end of the other part of the bell crank-shaped arm 49 whereby the latter is raised up. Thus, the stopper plate 52 is rotated about the shaft 50 in the anti-clockwise direction to shift from the position as illustrated in FIG. 6 to the position as illustrated in FIG. 4. As a result it is disengaged from the ratchet wheel 44 on the shaft of the roller 42 and at the same time the pressure roller 48 in the printing paper detecting roller section is parted away from the reduced diameter portion 47 of the stepped roller 46.

Then, a reel R wound with a strip of printing paper P in the form of a roll is fitted onto the reel supporting member 20 thereafter it is loaded in the case 1 with the aid of an opposing pair of bearings 12 with an U-shaped groove formed thereon. It should be noted that a certain guide member 80 is selected from a group of guide members depending on the width of printing paper P. Now, the foremost end part of printing paper P is pulled up against resistive force of the braking mechanism 36 and it is then displaced further via the adjust free roller 40 until it passes between the roller 42 and the pressure roller 43 in the printing paper delivering roller section, while both the side edges are inserted into the vertically extending grooves on the guide pieces 81 constituting the guide member 80. At this moment the cover 10 is closed.

As the slide plate 61 is thrusted downwardly by means of the thrusting force transmitting member 65 on the cover 10, the bell crank-shaped arm 49 is rotated in the clockwise direction with the aid of resilient force of the contractive spring 51 whereby the pressure roller 48 is caused to enter into the reduced diameter portion 47 of the stepped roller 46 and at the same time the stopper plate 52 is rotated about the shaft 50 in the clockwise direction to be engaged to the ratchet wheel 44. As a result, the roller 42 assumes the position as illustrated in FIG. 6 where it is inhibited from rotation in the reverse direction. Thus, the printing paper P can not be rewound with weak force and the roller 42 is rotatable only in the direction of delivering of the printing paper P. Owing to the arrangement made in that way there is no fear of causing the foremost end part of the printing paper P to be disengaged from the printing paper delivering roller section including the roller 42 and the pressure roller 43. Incidentally, at this moment the light shielding plate 71 in the light shielding member 70 assumes the position as illustrated in FIG. 4 where the printing paper delivering port 16 surrounded by the light shielding piece 17 is covered with it.

Next, as the magazine Y is mounted on the printer X with the aid of the feet 7 and 8 of the former adapted to come in sliding contact with the rails 156 on the printing paper cutting and delivering dark box 150 of the latter as illustrated in FIG. 10, the roller 76 is gradually introduced into the guide groove 159 on the guide plate 158. Since the pin 75 with the roller 76 rotatably carried thereon is displaced along the elongated guide hole 18 on the bottom plate 6, the light shielding plate 71 assumes the position as illustrated in FIG. 6 where the printing paper delivering port 16 is kept open, when mounting of the magazine Y on the printer is completed.

On the other hand, a pin 79 is previously inserted into a certain drilled hole on the printing paper size identifying member 78 which is determined with reference to the width of printing paper P that is called paper size. On completion of mounting of the magazine Y on the printer X any one among a group of limit switches 157 is actuated by the pin 79 in dependence on the selected paper size and thereby it is closed. Thus, a signal is transmitted to a receiving system (not shown in the drawings) for the purpose of informing the existent width of printing paper P loaded in the magazine Y.

Next, as the printing paper P is delivered further by rotating the handle 45, the pressure roller 48 is displaced away from the reduced diameter portion 47 of the stepped roller 46 in the printing paper detecting roller section against resilient force of the contractive spring 51 by means of the thrusting force of the foremost end part the printing paper P with assistance of ratchet wheel 44 and thereafter it moves down further to the first printing paper supplying roller section 152 in the printer X via the printing paper delivering port 16, the light shielding piece 17 and the printing paper receiving port 151 on the printing paper cutting and delivering dark box 150.

When the printer X starts its operation, the printing paper P is automatically pulled out of the reel R so that it is supplied into the printer X.

If there occurs necessity for replacing the existing printing paper P with other one during or after the preceding operation as described above, for example, because of any size change of printing paper, the printer X is caused to stop its operation after the printing paper P is cut by means of an opposing pair of cutters 155 and the pressure rollers in the first and second printing paper supplying roller sections 152 and 153 are parted away from the driving rollers. Thus, the printing paper P can be rewound by rotating the driving rollers in the reverse direction and moreover rotating the tubular core 22 in the reverse direction via a combination of the gear 27 and the pinion 15 adapted to be rotated by the handle 14.

When the cut end of the printing paper P is displaced upwardly past both the stepped roller 46 and the pressure roller 48 in the printing paper detecting roller section during the step of rewinding, the pressure roller 48 enters into the reduced diameter portion 47 of the stepped roller 46 under the influence of resilient force of the contractive spring 51 and thereby the roller 42 is inhibited from rotation in the reverse direction in the quitely same manner as described above. As a result, the printing paper P is hardly rewound due to its friction and an operator will find no necessity for rotation of the handle 14.

After the above operation, the magazine Y is dismounted from the printer X and it is then replaced with another one having another reel wound with printing paper P.

When the last magazine Y is to be reused, the magazine can be mounted immediately on the printer X without any loss of printing paper.

As will be readily understood from the above description, the early mentioned objects of the invention have been satisfactorily accomplished by providing an improved printing paper supplying magazine as constructed in the above-described manner.

While the present invention has been described above only with respect to a single preferred embodiment, it should of cource be understood that it should not be limited only to this but various changes or modifications may be made in a suitable manner without departure from the spirit and scope of the invention as defined in the apended claims.

What is claimed is:

1. A detachable or replaceable magazine for supplying a strip of photographic printing paper to a photographic printer of photographic processor comprising;
   a case constituting the magazine body,
   a cover turnably mounted on the top of said case,
   a printing paper delivering port formed on the case with a light shielding member displaceably fitted thereto,
   a detachable or replaceable reel supporting member for supporting a reel wound with printing paper, said reel supporting member being adapted to rotate also in the direction of rewinding of the printing paper by the movement of a manual actuation member disposed outside the case,
   a guide member for guiding movement of the printing paper strip while the side edges of said strip are fitted into vertically extending grooves formed on said guide member,
   a printing paper delivering roller means including a pair of rollers and a ratchet wheel fixedly mounted on a roller shaft, said rollers being adapted to rotate to deliver the printing paper by the movement of a manual actuation member disposed outside the case and said ratchet wheel inhibits rotation of said roller in the reverse direction as required,
   a printing paper detecting roller means for detecting the presence of printing paper and displacing a stopper plate in the direction of locking when no printing paper is present, said stopper plate serving to inhibit rotation of said printing paper delivering roller means in the reverse direction when it is brought into engagement with said ratchet wheel, and
   an unlocking member adapted to be actuated in operative association with opening operation of the cover for unlocking said stopper plate from said ratchet wheel.

2. A magazine as defined in claim 1, wherein said light shielding member includes a light shielding plate as a main component, said light shielding plate being normally urged to move in the direction of closing the printing paper delivering port formed on the bottom plate of the case under the influence of resilient force of spring means while being guided by means of guide members so as to slidably move along the bottom plate in both the directions, said guide members including a stopper serving to immovably hold the light shielding plate when the latter reaches the position where the printing paper delivering port is closed, and said light shielding plate including a pin which extend downwardly from the lower surface thereof located opposite to the bottom plate to project outwardly of the latter through an elongated guide hole which is formed on the bottom plate at a right angle relative to the printing paper delivering port, said pin having a roller rotatably carried on its lowermost end part so that said roller is adapted to serve for displacing the light shielding plate in the direction of opening of the printing paper delivering port.

3. A magazine as defined in claim 1, wherein said detachable or replaceable reel supporting member comprises a support shaft removably held on both the side plates of the case with the aid of a bearing means with an U-shaped groove formed thereon, a tubular core for carrying thereon a reel including a strip of printing paper wound in the form of a roll, reel holding plates for immovably holding the reel and a braking mechanism for inihibiting idle rotation of the reel supporting member due to inertia of the latter.

4. A magazine as defined in claim 3, wherein said tubular core includes a tubular body, bearing support plates press fitted into both the end parts of the tubular body through which the support shaft extends to be rotatably supported, a leaf spring disposed on the outer surface of the tubular body for inhibiting idle rotation of the reel, plural annular grooves formed on the outer surface of the tubular body for determining the position of the reel holding plates and a gear wheel fixedly attached to one end of the tubular body for rewinding the printing paper.

5. A magazine as defined in claim 3, wherein said reel holding plates include circular discs for slidably fitting onto both the end parts of the tubular body of the tubular core by inserting the latter through a large bore formed in the central part of said discs, said large bore having an inner diameter is dimensioned appreciably larger than the outer diameter of the tubular body, and two opposing pairs of fixing position determining plates by means of which the circular discs are fixedly disposed on the tubular body by inserting their semi-circular edges of said plates into annular grooves formed on the outer surface of said tubular core, one of said fixing position determining plates being immovably secured to the one half of the bore of the circular disc and the other one being slidably disposed on the other half of the same under the influence of resilient force of a spring means while it being guided by means of a pair of guide plates, said spring means serving to normally urge it toward the annular groove.

6. A magazine as defined in claim 3, wherein said braking mechanism comprises a spring retainer fixedly mounted on the support shaft, an expansive spring means and a frictional plate adapted to come in frictional contact with the bearing support plate press fitted into the one end part of the tubular core.

7. A magazine as defined in claim 1, wherein said printing paper delivering roller means includes a roller fixedly mounted on a shaft rotatably extending between both the side plates of the case and a pressure roller adapted to cooperate with said roller as main components, said shaft of said roller having a ratchet wheel carried thereon so as to inhibit rotation of the roller in the direction of rewinding of the printing paper as required and said shaft further including an inner teeth ratchet wheel type actuating handle at the outermost end part thereof projected outwardly of the one side plate, said handle being adapted to rotate the shaft only in the direction of delivering of the printing paper.

8. A magazine as defined in claim 1, wherein said printing paper detecting roller means includes a stepped roller with a reduced diameter portion formed at the middle part thereof and a counter-roller adapted to enter into said reduced diameter portion as main components, said stepped roller being mounted on a shaft rotatably extending between both the side plates of the case and said counter-roller being rotatably carried on the one part of a bell crank-shaped arm which is fixedly mounted at its bent portion on a shaft rotatably extending between both the side plates, said last mentioned shaft having a stopper plate fixedly secured thereto which is adapted to come into engagement with or out of engagement from the ratchet wheel on the one roller in the printing paper delivering roller means, the other part of said bell crank-shaped arm including a spring means connected thereto which serves to normally urge the counter-roller to ward the reduced diameter portion of said stepped roller.

9. A magazine as defined in claim 1, wherein said guide member for guiding movement of the printing paper from the printing paper delivering roller means to the printing paper delivering port on the bottom plate via the printing paper detecting roller means comprises an opposing pair of guide pieces with vertically extending grooves formed therein so that the printing paper strip is guided while the side edges of said strip are inserted into said grooves.

10. A magazine as defined in claim 1, wherein said guide member serves to guide movement of the printing paper from the printing paper delivering roller means to the printing paper delivering port on the bottom plate via the printing paper detecting roller means and includes a pair of guide pieces with vertically extending grooves formed thereon into which both the side edges of the printing paper strip are inserted and an opposing pair of support columns into which said guide pieces are fixedly attached with the aid of engagement means.

11. A magazine as defined in claim 1, wherein said unlocking member includes a slide plate as a main component adapted to slide along the inner wall of the rear plate of the case in response to opening or closing operation of the cover which is hinged to the top end of the rear plate, said slide plate serving to bring the stopper plate in the printing paper detecting roller means out of engagement with the ratchet wheel in the printing paper delivering roller means when the cover is closed.

* * * * *